Jan. 22, 1963        J. J. KERLEY, JR        3,074,681
PROTECTIVE ENCLOSURE SHOCK AND VIBRATION TYPE ISOLATOR MOUNT
Filed Nov. 27, 1959
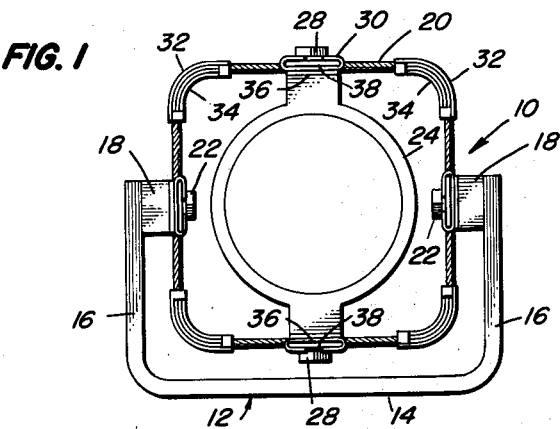
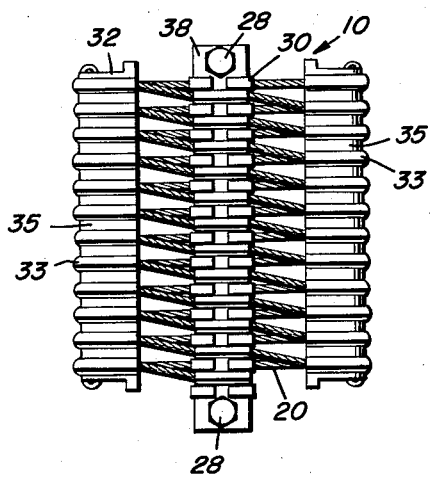
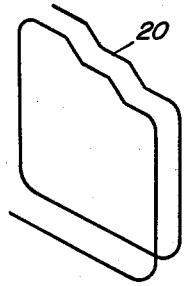
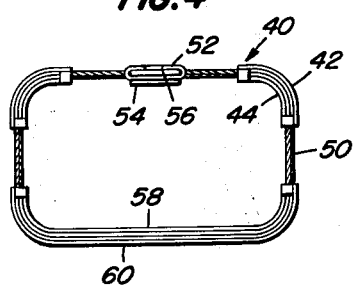
INVENTOR.
James J. Kerley, Jr.
BY
Walter G. Finch
ATTORNEY

United States Patent Office 3,074,681
Patented Jan. 22, 1963

3,074,681
PROTECTIVE ENCLOSURE SHOCK AND VIBRATION TYPE ISOLATOR MOUNT
James J. Kerley, Jr., Cheverly, Md., assignor to Kerley Engineering, Inc., College Park, Md., a corporation of Maryland
Filed Nov. 27, 1959, Ser. No. 855,817
4 Claims. (Cl. 248—358)

This invention relates generally to vibration and shock supports, and more particularly it pertains to protective enclosure type vibration and shock isolator mounts having vibration and shock isolating qualities for protecting delicate pieces of equipment, such as electronic devices.

There are occasions in industry where the requirements for mounting, protection, venting and vibration and shock isolation of a delicate unit, such as an electronic device, simultaneously exist. In the past, these several requirements have been met by separate, individual structures, each performing one of the functions. Unwieldy structure has often resulted, sometimes leading to further difficulties, such as overweight and the requirements of cooling.

A delicate electronic amplifier, for instance, may have hot exposed glass tubes, or a pump or gyroscope may have exposed rotating or oscillating parts. In either case, the provision of one structure to protectively enclose, mount, heat vent, and vibration and shock isolate the delicate device is of advantage.

It is, therefore, an object of this invention to provide a basket type vibration and shock absorber mount having a minimum of parts.

Another object of this invention is to provide a protective vibration and shock mount enclosure which is of simple lightweight construction and which has great strength and resiliency together with non-inflammable heat radiating and venting qualities.

These and other objects and attendant advantages of the invention will become more readily apparent and understood from the following detailed specification and acompanying drawings in which:

FIG. 1 is a side view of a basket type shock and vibration isolator mount constructed in accordance with the features of the present invention, shown mounted on a bracket and supporting an isolated unit;

FIG. 2 is a top view of the basket type shock and vibration isolator mount of FIG. 1;

FIG. 3 is a schematic view of a cable illustrating the winding arrangement for producing a basket type shock and vibration isolator mount such as depicted in FIG. 2; and FIG. 4 is a side view of an alternate design of a basket type shock and vibration isolator mount which provides an integral mounting base.

Referring now to the details of the drawings, FIG. 1 depicts a basket type shock and vibration isolator mount 10. The shock and isolator mount 10 consists of continuous, multi-turn passes of a resilient multi-strand cable 20 surrounding an isolated unit 24, such as an electronic amplifier, gyroscope, pump, or the like.

The passes of cable 20 are restrained in rectangular form by pairs of corners forming outer and inner curved corrugated sheets 32 and 34, respectively. Members 32 and 34 are secured together at both ends.

A plurality of cable pathway elements 33 and cable separation elements 35 are provided by the nested inner and outer curved, corrugated sheets 32 and 34 between which the cable 20 passes.

Intermediate of the four pairs of corner-forming, curved, corrugated sheets 32 and 34, there are provided four pairs of comb strips 36 and 38. The comb strips 36 and 38 are held in pairs by a plurality of clips 30 therearound and which also serve to separate the passes of cable 20 as shown in FIG. 2.

The comb strips 36 and 38 can be formed as illustrated and described in a co-pending patent application Serial Number 744,787, for "Vibration Isolator Mount" filed June 26, 1958, by James J. Kerley, Jr., et al. The comb strips each consist of a series of milled, broached, or extruded alternating grooves and ridges, having the cable 20 passing through each corresponding set of grooves. In addition, the resilient cable 20 may be solid or multi-stranded. The cable 20 is preferably wound as shown in FIGS. 2 and 3 with each convolution shifting a turn laterally at the same side of the rectangle.

A mounting bracket 12 is provided for supporting the shock and vibration mount 10. It has a flat bottom 14, with upturned sides 16, as shown in FIG. 1. The isolated unit 24 is secured to opposing pairs of comb strips 36 and 38 by means of mounting bolts 28. Bracket bolts 22 perform the function of securing the other two sides of the isolator 10 to the mounting bracket 12, with the upturned sides 16 being provided with tapped spacer strips 18 for this purpose.

An alternate basket type shock and vibration isolator mount 40 is shown in FIG. 4. In this design, the isolated unit support is all from a single pair of comb strips 54 and 56 held together and spacing a cable 50 by means of clips 52.

In all respects, the comb strips 54 and 56 and the clips 52 are similar to comb strips 36 and 38 and clips 30 which have been described in connection with FIGS. 1 and 2.

Likewise, a corner-forming inner and outer curved, corrugated sheets 42 and 44 resemble the previously described sheets 32 and 34. However, it will be noted that only two such pairs of sheets 42 and 44 are used and the rectangular form of passes of a cable 50 is accomplished by a nested pair of inner and outer corrugated base pans 58 and 60, respectively, each having end-secured complementary upturned sides.

In operational use, the unit 24 to be isolated from shock and vibration forces is mounted in the mount 10 as shown in FIGS. 1 and 2, or in the mount 40 as shown in FIG. 4.

Obviously, many other modifications and variations of the present invention are possible in light of the above teachings. It is, therefore, to be understood that within the scope of the appended claims the invention may be practiced otherwise than as specifically described.

What is claimed is:

1. A basket type of shock and vibration isolation mount for isolating an object from external shock and vibration forces, comprising, continuous, multi-turn passes of a resilient cable helically surrounding said object to be isolated from said shock and vibration forces, at least four spaced means supported by said cable for restraining said continuous cable about said object in a transverse as well as a longitudinal direction, means including a pair of comb strip elements positioned between adjacent pairs of restraining means for separating said multi-turn passes of said continuous resilient cable, means consisting of the sole positioning and support means for said object to be isolated for connecting said object to alternate pairs of said comb strip elements, and other means including a base with a pair of spaced extending arms connected to the other alternate pairs of comb strip elements.

2. A basket type of shock and vibration isolation mount for isolating an object from shock and vibration forces, comprising, multi-turn passes of continuous resilient cable helically arranged in substantially a rectangular configuration about said object to be isolated from said shock and vibration forces, means supported by said cable located along the intersecting faces of said rectangular configuration for restraining said continuous cable about said object in a transverse as well as a longitudinal direction, comb strip type means positioned between adjacent pairs of restraining means for separating said multi-turn passes of said continuous resilient cable, means consisting of the sole positioning and support means for said object to be isolated for connecting said object to alternate pairs of said comb strip type means, and other means including a base with a pair of spaced extending arms connected to the other alternate pairs of comb strip type means.

3. A basket type of shock and vibration isolation mount for isolating an object from shock and vibration forces, comprising, multi-turn passes of continuous resilient cable helically arranged in substantially a rectangular configuration about said object to be isolated from said shock and vibration forces, a pair of mating curved corrugated sheets supported by said cable located along each intersection of the faces of said rectangular configuration for restraining said continuous cable about said object, means including a pair of comb strip elements positioned between adjacent pairs of mating curved corrugated sheets for separating said multi-turn passes of said resilient cable, means consisting of the sole positioning and support means for said object to be isolated for connecting said object to alternate pairs of said comb strip elements, and other means including a base with a pair of spaced extending arms connected to the other alternate pairs of comb strip elements.

4. A basket type of shock and vibration isolation mount for isolating an object from shock and vibration forces, comprising continuous multiturn passes of a cable helically surrounding said object to be isolated in a substantially rectangular configuration, mounting means embracing and positioning the cable passes at least intermediately of a pair of opposed faces of said configuration, spaced restraining means supported by said cable located along the intersections of said opposed faces with a third face of said configuration for restraining said cable about said object in a transverse, as well as a longitudinal, direction, comb-strip means engaging the cable passes intermediately of the spaced restraining means, and means consisting of the sole positioning and support means for said object coupling said object to said cable comprising means connecting said object to said combstrip.

References Cited in the file of this patent
UNITED STATES PATENTS 1,786,136     Stearman _____ Dec. 23, 1930